United States Patent
Mahimkar et al.

(10) Patent No.: US 11,876,672 B2
(45) Date of Patent: Jan. 16, 2024

(54) CHANGE DEPLOYMENT SYSTEM

(71) Applicant: AT&T Intellectual Property I, L.P., Atlanta, GA (US)

(72) Inventors: Ajay Mahimkar, Edison, NJ (US); Carlos Eduardo De Andrade, Gainesville, FL (US); Rakesh Sinha, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/220,678

(22) Filed: Apr. 1, 2021

(65) Prior Publication Data

US 2022/0321408 A1 Oct. 6, 2022

(51) Int. Cl.
| | |
|---|---|
| *H04L 41/0816* | (2022.01) |
| *H04L 41/08* | (2022.01) |
| *H04L 43/0817* | (2022.01) |
| *H04L 41/0604* | (2022.01) |
| *H04L 41/0869* | (2022.01) |

(52) U.S. Cl.
CPC ...... *H04L 41/0816* (2013.01); *H04L 41/0627* (2013.01); *H04L 41/0869* (2013.01); *H04L 41/0886* (2013.01); *H04L 43/0817* (2013.01)

(58) Field of Classification Search
CPC ............ H04L 41/0816; H04L 41/0627; H04L 41/0869; H04L 41/0886; H04L 43/0817; H04L 41/0813; H04L 41/22; H04L 41/0879
See application file for complete search history.

(56) References Cited

U.S. PATENT DOCUMENTS

| | | | | |
|---|---|---|---|---|
| 7,496,912 | B2 * | 2/2009 | Keller | H04L 41/082 |
| | | | | 717/174 |
| 8,880,690 | B1 * | 11/2014 | Kennedy | H04L 41/0823 |
| | | | | 709/224 |
| 9,588,788 | B1 * | 3/2017 | Ramalingam | G06F 9/45558 |
| 9,992,064 | B1 * | 6/2018 | Chawla | H04L 41/082 |
| 11,196,627 | B1 * | 12/2021 | Khoo | H04L 41/0816 |
| 2013/0117425 | A1 * | 5/2013 | Jarl | G06F 16/9535 |
| | | | | 709/221 |
| 2013/0194616 | A1 * | 8/2013 | Abel | G06K 15/1861 |
| | | | | 358/1.15 |
| 2017/0134224 | A1 * | 5/2017 | Korkalo | H04L 41/22 |
| 2018/0309630 | A1 * | 10/2018 | Zhao | H04L 41/0893 |

(Continued)

OTHER PUBLICATIONS

"A Composition Framework for Change Management (Experience Track)"; ACM SIGCOMM; Aug. 2021; 20 pages.

(Continued)

*Primary Examiner* — Joseph L Greene
(74) *Attorney, Agent, or Firm* — Guntin & Gust, PLC; Miyoung Shin

(57) ABSTRACT

A framework referred to as COmposition fRamework for chaNge management (CORNET) may integrate re-usable abstraction, modular composition with plug-and-play capabilities, or automated translation of high-level change management intent into low-level implementations and mathematical models. CORNET may use real-world data collected from cellular networks (e.g., 4G or 5G) and virtualized services, such as virtual private networks (VPN) and software defined wide area networks (SDWAN) running in the cloud.

20 Claims, 7 Drawing Sheets

(56) References Cited

U.S. PATENT DOCUMENTS

| | | | |
|---|---|---|---|
| 2019/0306023 A1* | 10/2019 | Vasseur | H04L 41/16 |
| 2019/0369980 A1* | 12/2019 | Mair | H04L 67/34 |
| 2020/0296004 A1* | 9/2020 | Gonguet | G06Q 30/0201 |
| 2020/0382381 A1 | 12/2020 | Prabhu et al. | |
| 2021/0234754 A1* | 7/2021 | Golla | H04L 41/0816 |
| 2021/0351973 A1* | 11/2021 | Ford | H04L 41/064 |
| 2022/0231921 A1 | 7/2022 | Link et al. | |

OTHER PUBLICATIONS

Howell et al.; 14th USENIX Symposium on Operating Systems Design and Implementation; https://www.usenix.org/conference/osdi20; Nov. 2020; accessed Apr. 8, 2021; 6 pages.

"Minimizing Effort and Risk with Network Change Deployment Planning"; vol. 1 No. 1; Oct. 2021; 30 pages.

\* cited by examiner

CHANGE DEPLOYMENT SYSTEM

BACKGROUND

Networks are continuously changing in order to support the ever-increasing surge in applications such as high definition video, virtual reality, emergency services and to provide an enriched service quality of experiences. Network changes take the form of software upgrades, hardware changes, configuration changes, new feature activations, capacity improvements, or introduction of new technologies such as 5G, virtualization, containerization, and software defined networking. All changes come with a risk. If the change is not carefully managed, it can result in tremendous negative impact to user experiences, such as unavailable service, or poor quality and potentially significant loss of business revenues and reputation to service providers This background information is provided to reveal information believed by the applicant to be of possible relevance. No admission is necessarily intended, nor should be construed, that any of the preceding information constitutes prior art.

SUMMARY

A change management system may enable an operator to dynamically create a change management workflow and deploy the workflow for change execution. In an example, an apparatus may include a processor and a memory coupled with the processor that effectuates operations. The operations may include obtaining a workflow associated with executing one or more changes in a network; obtaining one or more verification rules for pre-impact and post-impact comparison of performance associated with the one or more changes in the network; determining a schedule for deploying the one or more network changes, wherein the deploying the one or more network changes is based on the workflow, the one or more verification rules, or operational constraints; executing the one or more changes in the network based on the schedule; subsequent to executing the one or more changes in the network, determining whether the pre-impact and post-impact comparison of performance is within one or more thresholds associated with the one or more verification rules; and sending an alert when the pre-impact and post-impact comparison is outside the threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
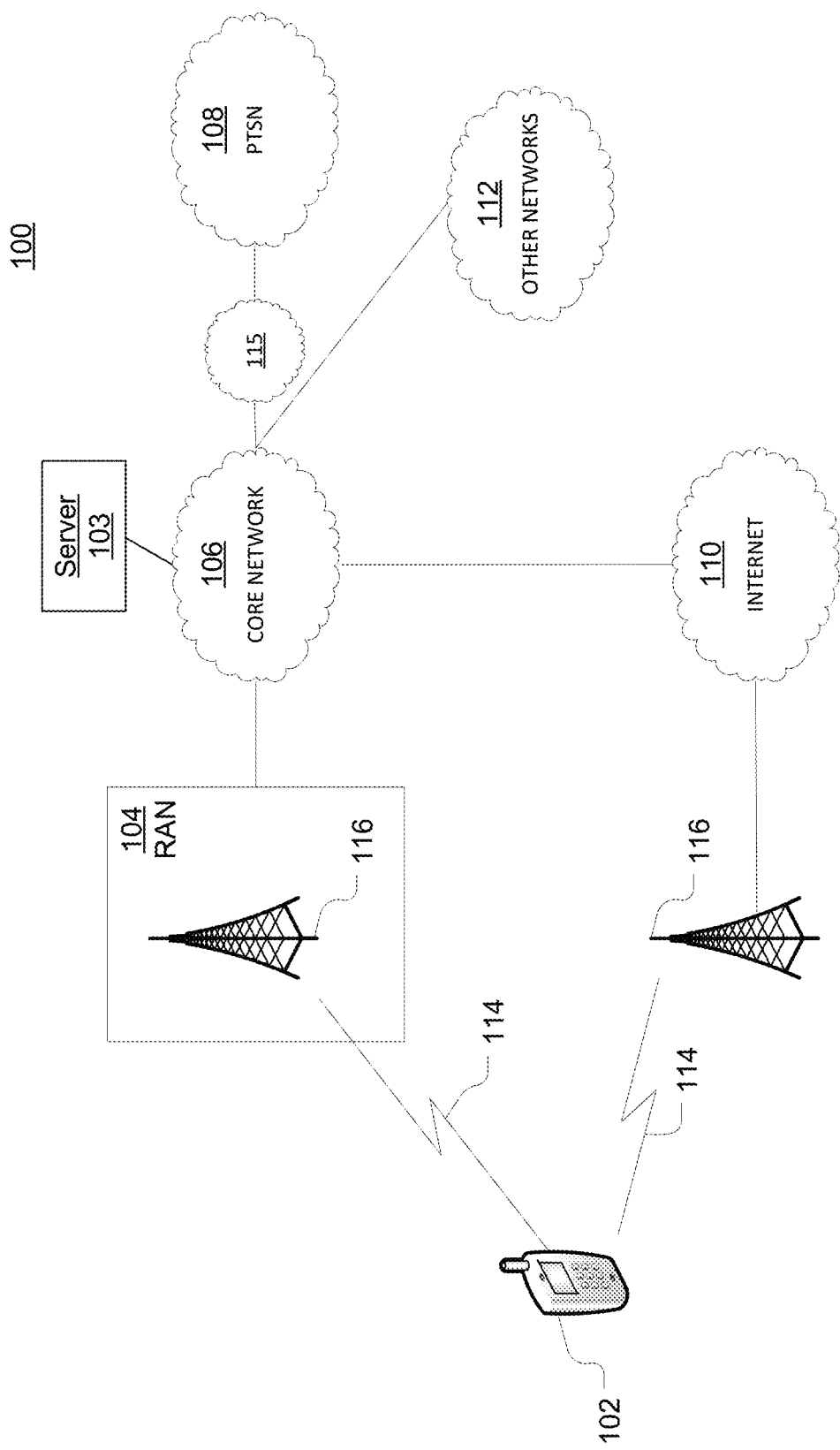
FIG. 1 illustrates an exemplary telecommunications system in which the disclosed methods and processes may be implemented.

Change management has been a long-standing challenge for network operations. The large scale and diversity of networks, their complex dependencies, and continuous evolution through technology and software updates combined with the risk of service impact create significant challenges in effectively managing changes. Disclosed herein are examples that use data from a large service provider and experiences of their operations teams to highlight the need for quick and easy adaptation of change management capabilities and keep up with the continuous network changes. A framework referred to as COmposition fRamework for chaNge management (CORNET) is also disclosed herein. The disclosed subject matter may integrate re-usable abstraction, modular composition with plug-and-play capabilities, or automated translation of high-level change management intent into low-level implementations and mathematical models. CORNET may use real-world data collected from cellular networks (e.g., 4G or 5G) and virtualized services, such as virtual private networks (VPN) and software defined wide area networks (SDWAN) running in the cloud.

For additional perspective, change management may be extremely challenging and has been a long standing problem for network operations teams because of the large scale and diversity of the networks, multiple physical, virtual, and containerized network functions (NF), cross-layer and service-layer complex dependencies, dynamic topologies, and multiple vendors. Change management tasks may include the following four phases: (i) design of a change and steps involved in implementing the change, (ii) planning the change deployment while ensuring available capacity to carry over the traffic and coordination across different network changes, (iii) execution of the change on individual network function instances with decision points for roll-back in case of unexpected fall-outs, or (iv) verifying the impact of the changes.

The state of art in change management has evolved over time with varying degrees of automation and robustness across the four phases. Many of the attempts to address issues associated with the four phases can be viewed as point solutions. They work beautifully for the specific network functions or services (e.g., routers, switches or data center networks) but they may require significant work to extend to new functions and services (e.g., base stations, virtualized gateways, or 5G radio access networks). Similar patterns have been observed across operations teams managing different parts of the networks (e.g., edge versus core), different types of changes (e.g., software upgrades versus configuration changes) and even different vendors for the same network function. Conventionally, each team implements and maintains their own automated solutions, but they cannot easily be re-used. As observed, hundreds of different network functions in large operational networks and creating custom solution for each of them is a daunting task. Further, the change planning and coordination is also extremely labor intensive across individual silos. The risk of change impact is modeled after individual network functions but not across groups (e.g., will there be an impact if change is implemented on an access router as well as a connected switch in the transport network?). Given the pace at which network evolves, one has to also update the change design and planning procedures, roll-back mechanisms and verifications rules not just for the new network functions but possibly also for existing network functions. As an example, with 5G technology being rolled out, it is important to verify service performance impacts across both 4G and 5G. Thus, the key challenge facing network operations teams today is to be able to easily and quickly adapt their change management capabilities.

FIG. 1 illustrates an exemplary system in which change management may deployed. As shown in FIG. 1, telecommunication system 100 may include use equipment (UEs) 102, a RAN 104, a core network 106, a public switched telephone network (PSTN) 108, the Internet 110, or other networks 112, though it will be appreciated that the disclosed examples contemplate any number of UEs, base stations, networks, or network elements, such as server 103. Each UE 102 may be any type of device configured to operate or communicate in a wireless environment. For example, a UE may include a drone, an autonomous vehicle, a mobile device, network device, or the like, or any combination thereof. By way of example, UEs 102 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. UEs 102 may be configured to transmit or receive wireless signals over an air interface 114.

Telecommunication system 100 may also include one or more base stations 116. Each of base stations 116 may be any type of device configured to wirelessly interface with at least one of the UEs 102 to facilitate access to one or more communication networks, such as core network 106, PTSN 108, Internet 110, or other networks 112. By way of example, base stations 116 may be a an eNode B, a gNode B, an access point (AP), a wireless router, or the like. While base stations 116 are each depicted as a single element, it will be appreciated that base stations 116 may include any number of interconnected base stations or network elements.

Base stations 116 may communicate with one or more of UEs 102 over air interface 114, which may be any suitable wireless communication link (e.g., RF, microwave, infrared (IR), ultraviolet (UV), or visible light). Air interface 114 may be established using any suitable radio access technology (RAT).

As another example base station 116 and UEs 102 that are connected to RAN 104 may implement a radio technology such as LTE, New Radio (NR), or the like.

RAN 104 may be in communication with core network 106, which may be any type of network configured to provide voice, data, applications, and/or voice over internet protocol (VoIP) services to one or more UEs 102. For example, core network 106 may provide call control, billing services, mobile location-based services, pre-paid calling, Internet connectivity, video distribution or high-level security functions, such as user authentication. Although not shown in FIG. 1, it will be appreciated that RAN 104 or core network 106 may be in direct or indirect communication with other RANs that employ the same RAT as RAN 104 or a different RAT.

Core network 106 may also serve as a gateway for UEs 102 to access PSTN 108, Internet 110, or other networks 112. PSTN 108 may include circuit-switched telephone networks that provide plain old telephone service (POTS). For LTE core networks, core network 106 may use IMS core 115 to provide access to PSTN 108. Internet 110 may include a global system of interconnected computer networks or devices that use common communication protocols, such as the transmission control protocol (TCP), user datagram protocol (UDP), or IP in the TCP/IP internet protocol suite. Other networks 112 may include wired or wireless communications networks owned or operated by other service providers. For example, other networks 112 may include another core network connected to one or more RANs, which may employ the same RAT as RAN 104 or a different RAT.

Some or all UEs 102 in telecommunication system 100 may include multi-mode capabilities. For example, UEs 102 may include multiple transceivers for communicating with different wireless networks over different wireless links. For example, one or more UEs 102 may be configured to communicate with base station 116, which may employ a cellular-based radio technology, and with base station 116, which may employ an IEEE 802 radio technology.

Figure 2:
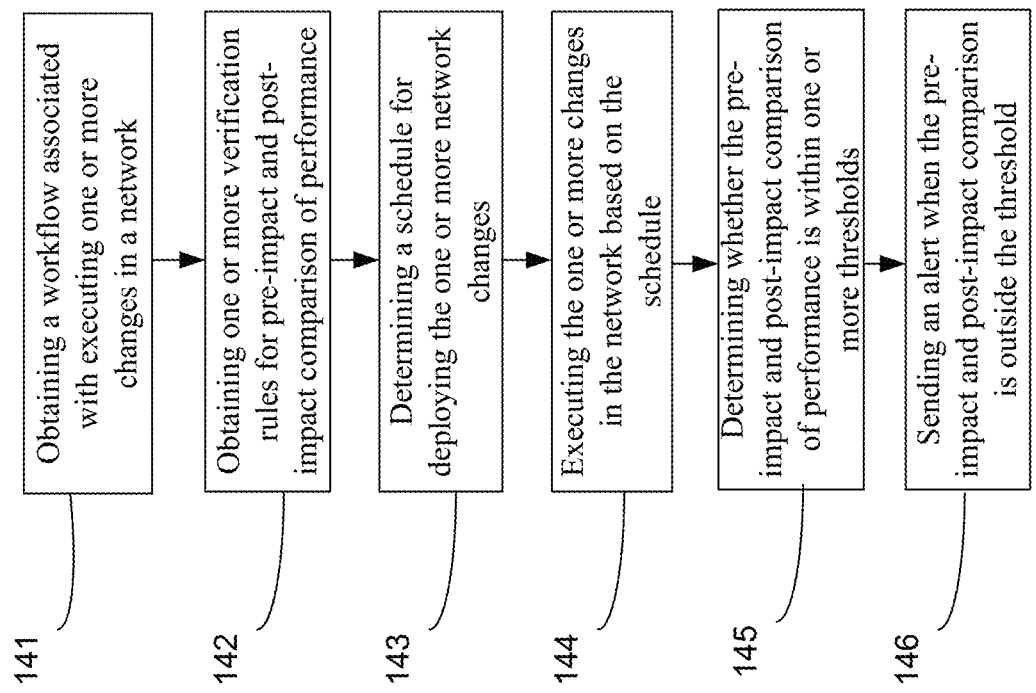
FIG. 2 illustrates an exemplary method for change management system.
Figure 3:
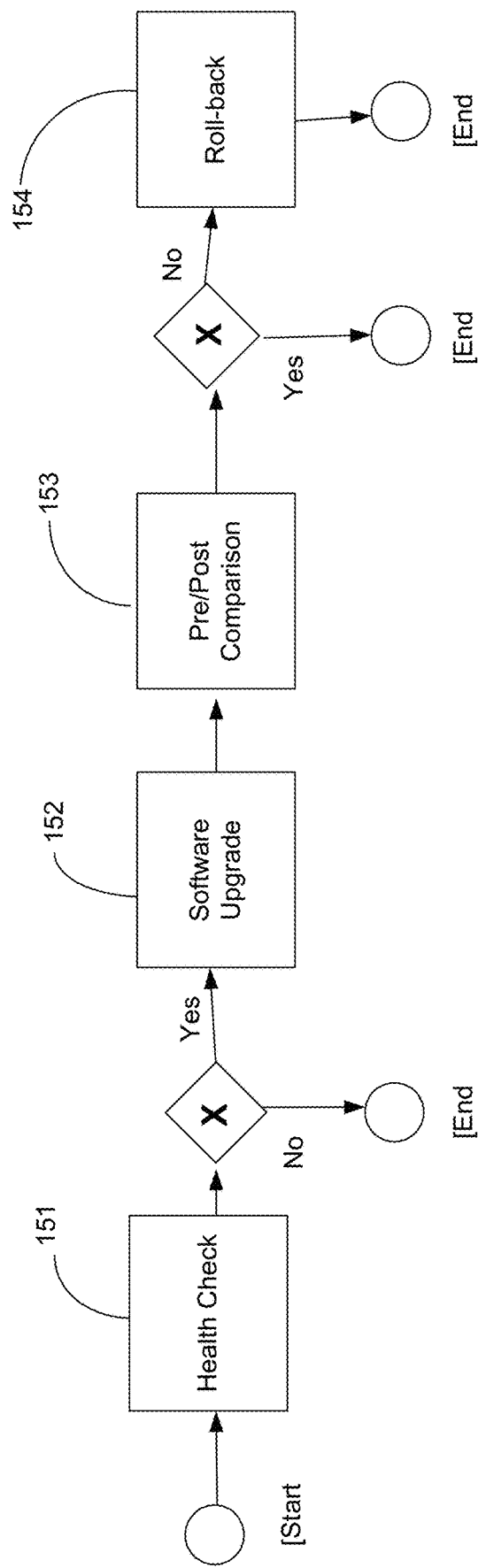
FIG. 3 illustrates an exemplary workflow.

FIG. 2 illustrates an exemplary method for CORNET. The disclosed method and systems may enable an operator to flexibly create the change management workflow and deploy the workflow in the orchestrator to get it ready for change execution. As shown in FIG. 2, at step 141, a workflow associated with executing one or more changes in a network may be obtained (e.g., received). The workflow may be created using a user interface of UE 102. In order to support flexible composition of the change workflow, there may be a catalog of building blocks that are modular, abstract, and reusable. For the network functions of the same type and vendor, these building blocks can be re-used across a large variety of changes such as software upgrades and configuration changes. The designer may enable drag-and-drop use of the building blocks to create a change workflow. This graphical approach for change workflow may simplify design tasks. Table 1 and FIG. 3 provide example building blocks and workflows. The building blocks may be defined in a catalog. Each building block may be defined using an input/output parameter list and may have a representational state transfer (REST) application programming interface (API). The implementation of the building block can use any programmable interface, such as Ansible playbooks, NetConf, Chef recipes, Python scripts, or vendor-specific CLIs (command line interface).

TABLE 1

| Building block | Function |
| --- | --- |
| Health check | Verify live and operational status |
| Conflict check | Ensure no conflicting activities |
| Traffic redirect | Migrate traffic away before the change |
| Software upgrade | Execution and verification of the upgrade |
| Pre/post comparison | Compare metrics before and after the change |
| Traffic restore | Bring traffic back after the change |
| Roll-back | Restore to the previous version |

With continued reference to the workflow of step 141, a model-driven approach may be used to change workflow composition using business process modeling and notation (BPMN) and link with a catalog of building blocks to enable graphical visualization and drag-and-drop capability in a designer. Decision blocks may be included in the designer to capture the decision logic. For example, after health check, sever 103 check if the execution was successful and based on the execution status, sever 103 may provide instructions to create different paths in the workflow (e.g., roll-back, or quit or continue). The building blocks and decision blocks can be viewed as nodes and they may be connected by edges. The input and output of the workflow should align with the inputs and outputs across the building blocks. Some of the building blocks can generate new output variables that can be input for others. The variables may be stored using global state information within the BPMN. As shown in FIG. 3, a simple software upgrade workflow example using BPMN with four building blocks, such as health check block 151, software upgrade block 152, pre/post comparison block 153, roll-back block 154, and two decision operators after health check and pre/post comparison. If the health check fails (decision output is no), then the action is to end the workflow. If the pre/post comparison after the software upgrade fails (decision output is no), then the action is to roll-back the software. The input to the workflow (or, start) may be the network function (NF) instance and the software version for the upgrade. The output may be the status of execution.

After an initial design of the change workflow, a verification process may be used to help ensure that there are no zombie building blocks (e.g., without any edges). After the verification process, the change workflow may be ready for deployment by an orchestrator. For workflow deployment, we take the BPMN graphical layout with building blocks captured using the corresponding REST APIs and then dynamically create the web application resource (WAR) file which is the meta-code stitching the different building blocks into a workflow. Different changes can result in different WAR files and having CORNET automatically generate the WAR enables operations teams to easily and dynamically generate different change compositions. The WAR can be referenced using a dynamically generated REST API for the newly created change workflow. For each workflow created within the designer, it can be associated with the corresponding WAR and REST API. The REST API information may be important during the run-time dispatching and invocation of the change execution.

With continued reference to FIG. 2, at step 142, one or more verification rules for pre-impact and post-impact comparison of performance in connection with the nodes or services associated with the one or more changes of the network may be obtained. And at step 143, schedule for deploying the one or more network changes may be determined, which may be based on the workflow, the one or more verification rules, or operational constraints. Operational constraints are a subset of scheduling constraints. Scheduling constraints are constraints that should be followed during scheduling. It may be operational, technological, etc.

Different change work-groups and services have different change scheduling constraints based on the network function the group is scheduling. Considering there may be 100+ network functions, to build and maintain custom algorithms or custom mathematical models (through standard mixed-integer programming approaches) for each network function may conventionally be a very onerous task. Therefore, a dynamic, on-the-fly model-driven approach to formulate the change schedule planning problem should be taken. For example, the operational intent may be captured using high-level constraint rules. Depending on the composition of the constraint rules, the constraint rules to constraint templates may be automatically mapped (e.g., using MiniZinc). MiniZinc is an open-source constraint modeling language to create the mathematical models. For each MiniZinc model that is dynamically generated based on operational intent, an optimization solver may be used (e.g., constraint programming solver such as Google OR-Tools, or mixed-integer linear programming solver such as COIN-OR CBC) to identify the best schedule conforming to the constraints. Note that the change operator may only deal with high-level scheduling constraints rules and may not need to understand or modify the underlying templates.

The operational constraints for the schedule planning for the one or more network changes may be associated with the following: a conflict scope constraint, a concurrency constraint, a consistency constraint, a uniformity constraint, a localize constraint, or a conflict tolerance constraint. Conflict scope constraint aims to avoid concurrent change activities on the same network function instance by multiple work groups, or dependent instances on the service chain (e.g., conflict between virtual gateway (vGW) and its hosting physical server in software-defined wide area network (SD-WAN)). Concurrency constraint may be used in attempt to maximize the number of network function instances to be executed concurrently within a group (e.g., Element Management System EMS, or pool). The operational intent may restrict concurrent executions to ensure network availability or conform to any execution limits. Consistency constraint may try to schedule dependent changes together. For example, co-located 4G and 5G radio software upgrades should be deployed close in time to ensure software compatibility. Uniformity constraint tries to schedule changes such that instances have the same attribute values. For example, schedule instances together that belong to the same time-zone (or, sometimes nearby time-zones). Localize constraint tries to complete instances within a group before starting the next. This is to ensure smooth change deployment and simplified impact verification. Conflict tolerance constraint tries to discover the change schedule plan that is conflict-free (zero tolerance) or minimal conflicts. Most of the times, the operations teams aim to request conflict-free schedules. However, there are times during emergency deployment of changes or those that do not result in any service disruption (e.g., certain configuration changes), one would want to have a tighter schedule with minimal conflicts.

With continued reference to step 142 and step 143, multiple instances of high-level change plan intents may be chosen. High level intent may be that the schedule should be conflict free, concurrency level of X (for no or minimum service disruption), or consistency constraint to group dependent nodes together, among other things. CORNET translate these high-level change plan intents into low-level mathematical constraints that were modeled. Such composition and the subsequent translation often may not be straightforward and may present interesting challenges. Composition example is constraint A, B, C or constraint B, D, E. One or more aspects to accomplish composition with change planning may include the following: 1) Elementary Schedulable Attribute (ESA), which defines the atomic unit to be scheduled, 2) Conflict Attribute (CA), which defines which attribute should be considered when checking conflicts (can be same instance or neighbors); 3) time granularity, which defines discrete timeslot where ESA can be scheduled; and 4) the dynamic set of constraints. Note that these definitions are specified according to the supplied inventory, and therefore, they are agnostic to the element type. Table 2 provides an example specification of the high-level intent to compose (a) concurrency constraint on the attribute common_id (which is the network function instance), (b) concurrency constraint on common_id concerning to the market that is derived from the inventory attributes, or (c) uniformity constraint on the time-zone. Such user-supplied constraints are translated to a mathematical model coded in MiniZinc, and then, submitted to an optimization solver. These Minizinc models can be very long.

TABLE 2

```
[{
    " name ": " concurrency ",
    " base_ attribute ": " common_ id ",
    " operator ": " <=",
    "granularity ": {" metric ": " day ", " value ": 1 },
    " default_ capacity ": 300
},{
    "name ": " concurrency ",
    " base_ attribute ": " common_ id ",
    " aggregate_ attribute ": " market ",
    " operator ": " <=",
    "granularity ": {" metric ": " day ", " value ": 1 },
    " default_ capacity ": 100
},{
    " name ": " uniformity ",
    " attribute ": " timezone ",
    " value ": 1
}]
```

As disclosed, the MiniZinc or the like models may be very long, any may ordinarily tackle the core network but not the large scale of operational networks close to the edge, which have on the order of hundreds of thousands of instances. Several ways may be used to scale up the dynamic composition and optimization solvers in MiniZinc or the like to tens of thousands of instances. The following are a few ways that can be applied independently, such as a first way in which the consistency constraint forces us to schedule certain changes together. Thus, the changes could be divided into non-overlapping groups such that each group needs to be scheduled together and then solve the problem on the small number of groups in which a second way is to divide the changes into sets that have no dependencies with respect to constraints. Then, we can solve in parallel and combine their solutions.

The model-driven composition may allow for flexibility, but that may affect the running time and the schedule quality. Based on the popular composition patterns across operations teams, a few custom heuristics were devised to deal with the large scale of the network. The composition in customer heuristic may be "hard-coded" but the running time may be lower than the generic and flexible solver.

At step 144, the one or more changes may be executed based on the determined scheduled. An orchestrator may be automatically invoked to implement the one or more changes in the network at the specific time for the scheduled instances. If multiple instances have to be executed concurrently, they may be handled in run-time and as soon as workflows for individual instances complete, the workflow for the next instance is triggered. The orchestrator may invoke the REST API for the change workflow.

At step 145, there may be a pre-impact and post-impact analysis (e.g., comparison of performance before and after). The orchestrator may sift through the individual building blocks as stitched in the designer and log the status of execution. This fine-grained logging can enable the ability to do a post-hoc analysis of the executions. At step 146, an alert may be sent based on the pre-impact and post-impact analysis. Alternatively or in addition the changes may be automatically halted or reversed based on reaching a threshold level based on the pre-impact and post-impact analysis.

A pause and resume functionality within the orchestrator may support halts in the workflow, with each building block execution treated in an atomic fashion. Atomic may be viewed as either the entire building block executes or none of it executes. As the one or more changes are being executed across multiple network function instances, a comparison is done of the performance (e.g., latency, alarms, etc.) before and after the one or more changes of the network. The verification process operates on multiple time-scales—minutes or hours after the change to detect massive degradations, or days after the change to detect subtle impacts. During experiments multiple verification rules were created for each change based on their expectation and the intent of the change. For example, one software upgrade results in an expected improvement in voice call quality but a very minor degradation to data throughput. By embedding these verification rules, there can be a focus on the relevant impacts. Furthermore, in order to support composition of the verification rules across different changes, the data processing and rule generation may be separated from the statistical analysis. The statistical analysis may apply generically to the data set input and the rules. Example data is CPU utilization or data throughput and rule can be around a software upgrade, in which one expects data throughput to improve and CPU utilization to not increase. We normalize the data and construct time-series for the statistical analysis. So, the data set could have been any of the performance metric. Also, the rules can be defined apriori to the statistical analysis.

Verification rule composition. Multiple data adaptors may be created to support connectivity to databases such as Oracle, HP Vertica, and summaries using Spark. A simplified interface may be displayed to users (e.g., operations teams) agnostic of the underlying database to create their corresponding key performance indicators (KPI) and alarm queries. The abstract interface (e.g., generic interface in which one can specify any time granularity of interest) may include the time during which the KPI have to be collected, their time granularity (15-minutes, hourly, or daily), network function instance identifier, the KPI/alarm numerator and denominator and the corresponding database tables (e.g., single as well as joint). Also, aggregation of the KPI is supported across multiple configuration attributes, such as software/hardware version, or geographic location. The aggregation function may be the average, median, or weighted average across the configuration attributes.

Statistical Analytics. Different group comparisons may be implemented, such as study group (where the change was implemented) versus control group (change was not implemented) comparison to enable robust verification of the impact of the one or more changes in the network. A regression model may be created between the study group (S) and control group (C) KPI time-series for the interval before the change $S=\beta C$. Then using the control group C' KPI time-series after the change, the study group (S") KPI time-series after the change may be predicted. If there is no statistical difference between the study group timeseries prediction (S") with study group measured after the change (S'''), then there may be an inference that there is no impact. Robust rank-order test of medians may be used to compare S" with S'''. This analysis may be repeated for each instance (e.g., virtual network function or hardware) that undergoes the change. The challenge is the staggered roll-out of network changes and thus there is a large number of study group KPI time-series that an operator would need to look at. In experiments, this was tackled through time-alignment and normalization analogous to Mercury and through support of the automated summarization of the impact across a wide composition of the verification rules and across multiple configuration attributes. For example, one verification query may compare the KPIs across location aggregations of all eNodeBs, carrier frequencies, morphology, and markets. The impacts may be presented on display (or fed to another computer-implemented process) for enabling a quick go/no-go decision to continue the roll-out or halt.

The verification of impact may be across multiple performance metrics such as router CPU and memory utilizations and packet losses rate and packet discards rates. In an example, the memory utilizations may increase slightly because of a larger image size.

The steps disclosed herein may be orchestrated by one device (e.g., server 103) or over multiple devices.

In an experiment, a technical effect of the disclosed subject matter allowed for an execution of a software upgrade enabled the network operations teams to reduce the work time from approximately 30 minutes to 4 minutes per instance. Conventionally operations teams face tremendous challenges with coordinating their change activities and verifying their impacts across tens of thousands of network function instances and hundreds of key performance indicators (KPIs). CORNET may be used to schedule many changes for network devices, such as eNodeBs, gNodeBs, smart integrated access device (SIAD), MME, or the like. CORNET may be used to verify the impact of one or more changes to the network carefully and continuously. In experiments, CORNET identified subtle degradations in service performance that resulted in detailed root-cause analysis and resolution of the issues through subsequent software patches and configuration changes.

There may be multiple usage patterns for CORNET. A first usage pattern may be to use CORNET to minimize the conflicts and attempt to ensure the uniformity constraint to schedule nodes with the same time-zone, because of a role of an operations team in deploying configuration changes which are non-disruptive, and thus the goal was to quickly roll-out the change across the whole network. A second usage pattern may be to deploy software upgrades with zero conflict tolerance, localize, uniformity, or consistency constraints. In an example, a software upgrade team may use the consistency constraint during the introduction of 5G for grouping the eNodeB and gNodeB upgrades together in order to support software compatibility and thus avoid any disruption due to handover failures.

CORNET may improve operational efficiency in schedule planning. Through interviews with the operations teams (approximately 30 work groups), we identified that before CORNET, the operations teams would take a batch approach where they would manually identify the schedule for a subset of nodes that are conflict-free and conforming to constraints. This task would take them around an hour sifting through databases and coordinating with other work groups. They would then repeat this task until all nodes to be upgraded were covered. Now, with CORNET, the operations teams may request the change schedule across the whole network in a single request. For a network size of one hundred thousand devices (virtual or hardware), CORNET takes only a few minutes to automatically discover the schedule that conforms to multiple planning constraints. The average human time savings as the percentage reduction in schedule discovery time as a result of using CORNET is 88.61%, and thus a significant improvement in operational efficiency for change planning. With CORNET, the network operations teams are able to roll-out the change activity across the whole network significantly faster as compared to without CORNET.

Further, the operations teams may use CORNET to automatically monitor a large number of KPIs and across a large number of location aggregation attributes as the changes are being rolled out in a staggered fashion. This results in a significant time reduction (approximately 98%) in verifying the impact of network changes, thereby leading to a significant improvement in operational efficiency. Study versus control comparison also assists with a robust impact assessment. Threshold level impacts detected by CORNET may be used in rules to make a go/no-go decision.

In addition, a location attribute based aggregation of impact is functionality that may highlight which attribute or network configuration is contributing to the unexpected performance impact. This information may used to halt or reverse changes only for a few specific nodes with the problem configuration instead of halting across the whole network. Thus, the rest of the network may still be upgraded while a patch was being developed for a problematic configuration. This on-the-fly and optimized roll-out process may enable an intelligent roll-out strategy for operations teams.

Network and service architecture of different services and change management flow are further disclosed below. In a virtual private network (VPN), the customer network connects to the core backbone network via pairs of customer edge (CE) routers and provider edge (PE) routers. There may be a mix of physical and virtualized PE and CE routers and they can share the same infrastructure, such as a core router.

Any network functions (e.g., device of FIG. 1, FIG. 4, FIG. 5, FIG. 6A, FIG. 6B, virtual CE router, SDN WAN virtual GW, 5G gNodeB, 4G MME, etc.) can undergo changes. A change activity may start from designing the change that involves packaging the different components via an upgrade, feature activations, configuration changes, or hardware updates. Experiments were conducted on a testbed of virtualized network functions.

Figure 4:
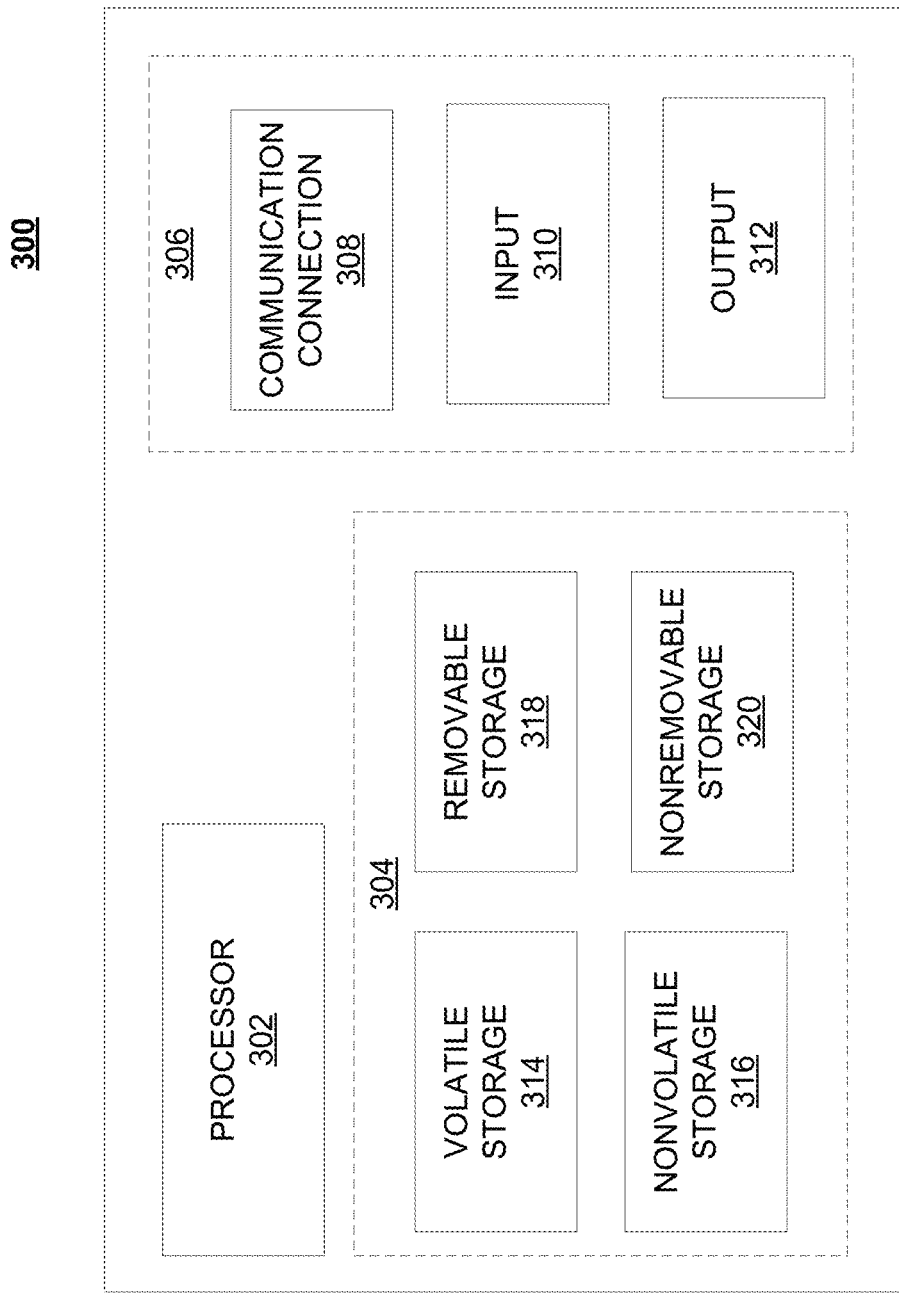
FIG. 4 illustrates a schematic of an exemplary network device.

FIG. 4 is a block diagram of network device 300 that may be connected to or comprise a component of a wireless network. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
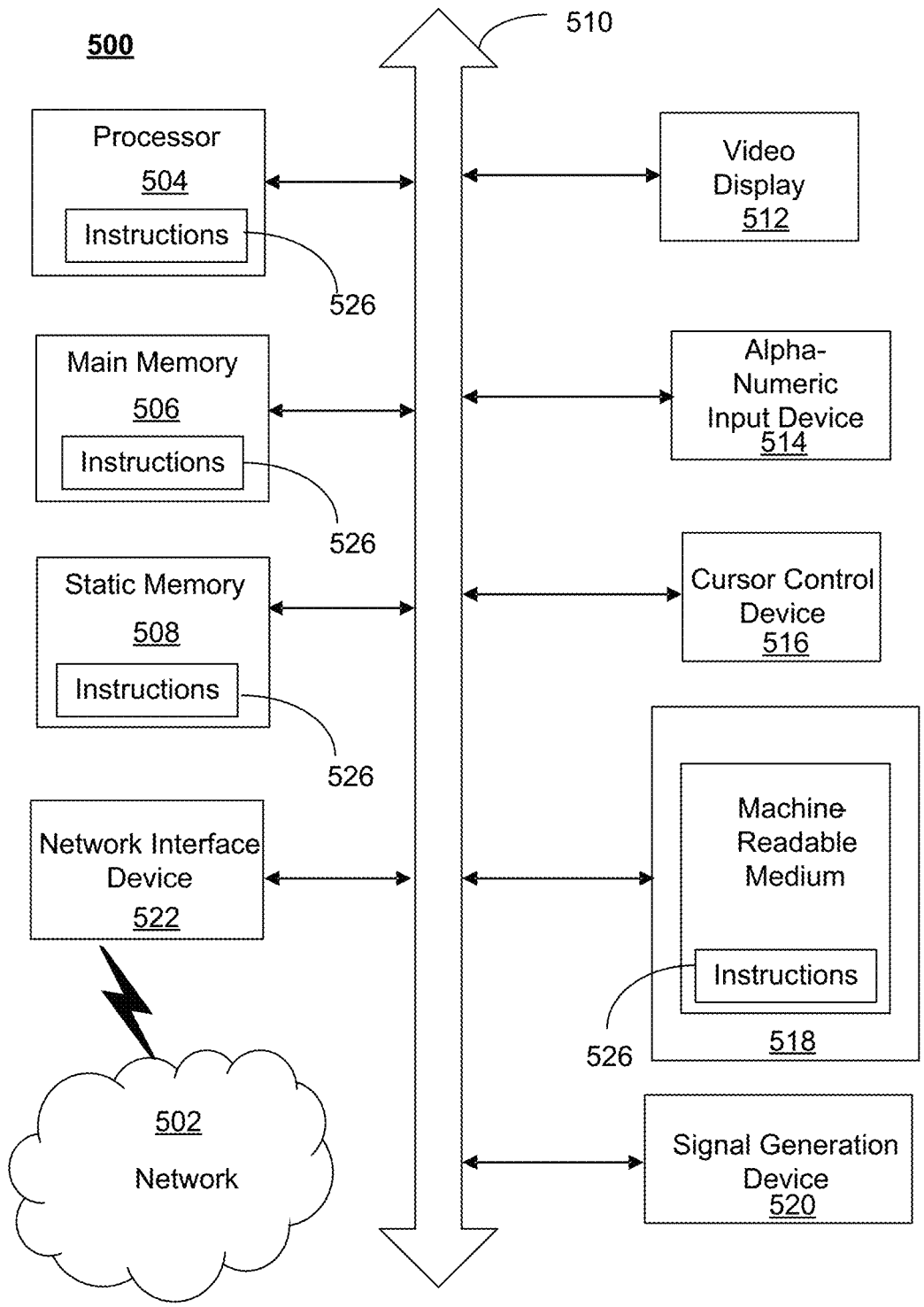
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 102, base station 116, server 103, and FIG. 3. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
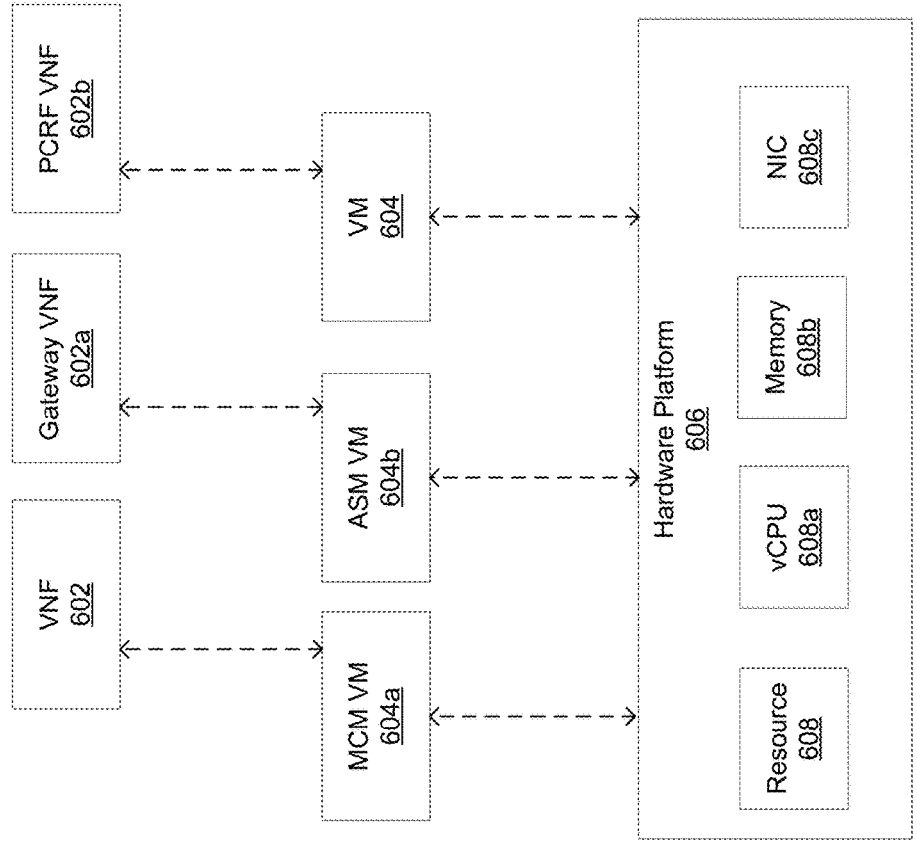
FIG. 6A is a representation of an exemplary network.

FIG. 6A is a representation of an exemplary network 600. Network 600 (e.g., network as shown in FIG. 1) may include an SDN. For example, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6A illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6A illustrates a management control module (MCM) VM 604*a* and an advanced services module (ASM) VM 604*b*. Additionally or alternatively, VMs 604 may include other types of VMs, such as a DEP VM (not shown). Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 6B:
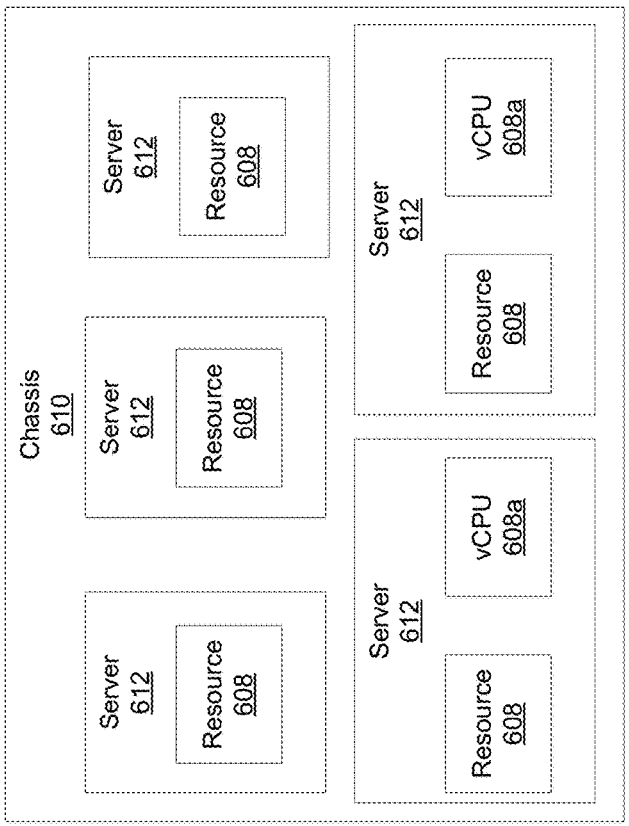
FIG. 6B is a representation of an exemplary hardware platform for a network.
Figure 6B:
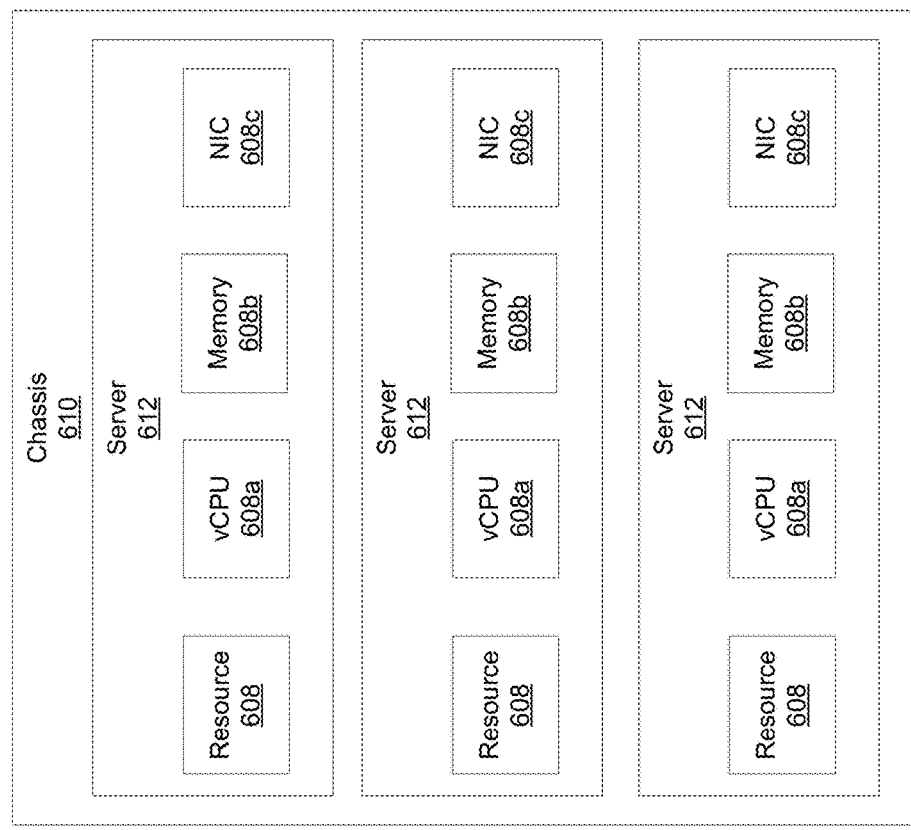

While FIG. 6A illustrates resources 608 as collectively contained in hardware platform 606, the configuration of hardware platform 606 may isolate, for example, certain memory 608*c* from other memory 608*c*. FIG. 6B provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chassis 610 may be communicatively coupled. Additionally or alternatively, chassis 610 may be communicatively coupled together (not shown) in any combination or arrangement.

The characteristics of each chassis 610 and each server 612 may differ. For example, FIG. 6B illustrates that the number of servers 612 within two chassis 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604*a*, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chassis 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have enough resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration— three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)— would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chassis 610 and servers 612 of hardware platform 606, and the individual resources 608 of each chassis 610 or server 612 (e.g., of a certain type), an integer programming problem may be formulated.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a system in which a change deployment system can be processed and managed have been described in connection with various computing devices/ processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—change deployment system—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing network changes. A method, system, computer readable storage medium, or apparatus has The designer enables an operator to flexibly create the change management workflow and deploy the workflow in the orchestrator to get it ready for change execution. The operator can define the verification rules for pre/post impact comparison. The schedule planner takes into account operational constraints and discovers the schedule for deploying the changes on individual network function instances. It deploys the schedule into the run-time dispatcher. The dispatcher then invokes the orchestrator to execute the change workflow on the instances. Finally, the verifier conducts a robust pre and post comparison of the network and service performance and ensures that the impacts are expected. For unexpected impacts, it automatically notifies the operator who then can make a decision for halting the roll-out and potentially roll-back the changes. A workflow may be considered a sequence of steps—e.g., for building blocks A, B, C, . . . Z. One workflow may be A-B-C; another can be E-F-G-X-Y. Verification rules may be separate from a workflow. Rules are conditions. Example, if software upgrade results in a KPI degradation, then take an action. An action may be an email notification, rolling back the software, or a sequence of the two—roll back and then notify via email, among other things. All combinations in this paragraph and the following paragraph (including the removal or addition of steps) are contemplated in a manner that is consistent with the other portions of the detailed description.

The method, system, computer readable storage medium, or apparatus may provide for obtaining a workflow associated with executing one or more changes in a network; obtaining one or more verification rules for pre-impact and post-impact comparison of performance associated with the one or more changes in the network; determining a schedule for deploying the one or more network changes, wherein the deploying the one or more network changes is based on the workflow, the one or more verification rules, or scheduling constraints; executing the one or more changes in the network based on the schedule; subsequent to executing the one or more changes in the network, determining whether the pre-impact and post-impact comparison of performance is within one or more thresholds associated with the one or more verification rules; and sending an alert when the pre-impact and post-impact comparison is outside the threshold. The method, system, computer readable storage medium, or apparatus may provide for halting or reversing the one or more changes in the network when the pre-impact and post-impact comparison of performance is outside the threshold. The scheduling constraints may include a conflict scope constraint, a concurrency constraint, a consistency constraint, a uniformity constraint, a localize constraint, or a conflict tolerance constraint. The pre-impact and post-impact comparison of performance may include analysis of service performance information or network performance information. The threshold may be for one or more key performance indicators that comprise latency in a location involving one or more nodes that changed during the one or more changes in the network. The threshold may be for one or more key performance indicators that may include successful voice and data connection establishments, data throughput, call drops, or latency. All combinations in this paragraph and the previous paragraph (including the removal or addition of steps) are contemplated in a manner that is consistent with the other portions of the detailed description.

What is claimed:

1. A method comprising:
obtaining a workflow associated with executing one or more changes in a communications network by enabling an operator to graphically create the workflow via a user interface that facilitate a composition of a catalog of building blocks, wherein the building blocks are modular, reusable and modifiable to match a specific change in the communications network and a specific vendor based on real data collected from cellular networks and virtualized services, and
wherein each building block executes a specific function needed to implement the specific change in the communications network and the operator is enabled to generate the workflow as a sequence of selected building blocks among the catalog of building blocks, the sequence aligning input and output of the workflow with inputs and outputs of the selected building blocks, and
wherein each building block is defined using an input/output parameter list and has a representational state transfer (REST) application programming interface (API);
obtaining one or more verification rules for comparing pre-impact network performance and post-impact network performance associated with the one or more changes;
determining a schedule for deploying the one or more changes in the communications network, wherein the deploying the one or more changes is based on the workflow, the one or more verification rules, and scheduling constraints, wherein the scheduling constraints comprise a conflict scope constraint, a concurrency constraint, a uniformity constraint, and a localize constraint, and wherein the concurrency constraint maximizes a number of network function instances to be executed concurrently within a group of virtual network elements, and wherein the uniformity constraint constrains schedule changes such that instances have common time zone attribute values;
executing the one or more changes in the communications network according to the schedule;
subsequent to executing the one or more changes in the communications network, determining whether a comparison of the pre-impact network performance and the post-impact network performance is within one or more thresholds associated with the one or more verification rules; and
sending an alert when the comparison is outside the one or more thresholds.

2. The method of claim 1, further comprising halting or reversing the one or more changes in the communications network when the comparison is outside the one or more thresholds.

3. The method of claim 1, wherein the localize constraint ensures that the changes are implemented within a first group of the network function instances before continuing to a second group of the network function instances.

4. The method of claim 1, wherein the conflict scope constraint avoids concurrent changes on the same network function instance by dependent network function instances on a service chain.

5. The method of claim 1, wherein the one or more thresholds is for one or more key performance indicators that comprise latency in a geographic location involving one or more nodes that changed during the one or more changes in the communications network.

6. The method of claim 1, wherein the one or more thresholds is for one or more key performance indicators that comprise successful voice and data establishments, call drops, and latency.

7. The method of claim 1, wherein the conflict scope constraint prevents concurrent change activities on the same network function instance by multiple work groups, or dependent instances on a service chain.

8. A system comprising:
one or more processors; and
a memory coupled with the one or more processors, the memory storing executable instructions that, when executed by the one or more processors, cause the one or more processors to effectuate operations comprising:
obtaining a workflow associated with executing one or more changes in a communications network, wherein the obtaining the workflow further comprises enabling drag-and-drop use of a catalog of building blocks to create the workflow, wherein the building blocks are modular, reusable and modifiable to match a specific change in the communications network and a specific vendor based on real data collected from cellular networks and virtualized services, and
wherein each building block is configured to execute a specific function needed to implement the specific change in the communications network and an operator is enabled, on a user interface, to generate the workflow as a sequence of selected building blocks among the catalog of building blocks, the sequence aligning input and output of the workflow with inputs and outputs of the selected building blocks, and
wherein each building block is defined using an input/output parameter list and has a representational state transfer (REST) application programming interface (API);
obtaining one or more verification rules for comparing pre-impact network performance and post-impact network performance associated with the one or more changes;
determining a schedule for deploying the one or more changes in the communications network, wherein the deploying the one or more changes is based on the workflow, the one or more verification rules and scheduling constraints, wherein the scheduling constraints comprise a conflict scope constraint, a concurrency constraint, a uniformity constraint, and a localize constraint, and wherein the concurrency constraint maximizes a number of network function instances to be executed concurrently within a group of virtual network elements, and wherein the uniformity constraint constrains schedule changes such that instances have common time zone attribute values;
executing the one or more changes in the communications network according to the schedule;

subsequent to executing the one or more changes in the communications network, determining whether a comparison of the pre-impact network performance and the post-impact network performance is within a threshold associated with the one or more verification rules; and
sending an alert when the comparison is outside the threshold.

9. The system of claim 8, the operations further comprising halting or reversing the one or more changes in the communications network when the comparison is outside the threshold.

10. The system of claim 8, wherein the scheduling constraints comprise a conflict tolerance constraint.

11. The system of claim 8, wherein the comparison comprises service performance.

12. The system of claim 8, wherein the threshold is for one or more key performance indicators that comprise latency in a geographic location involving one or more nodes that changed during the one or more changes in the communications network.

13. The system of claim 8, wherein the threshold is for one or more key performance indicators that comprise successful voice and data connection establishments.

14. The system of claim 8, wherein the scheduling constraints comprise a consistency constraint.

15. A non-transitory, computer readable storage medium storing computer executable instructions that when executed by a computing device cause said computing device to effectuate operations comprising:
obtaining a workflow associated with executing one or more changes in a communications network by enabling graphical visualization and drag-and-drop through a link to a catalog of building blocks, wherein the building blocks are modular, reusable and modifiable to match a specific change in the communications network and a specific vendor based on real data collected from cellular networks and virtualized services, and
wherein each building block executes a specific function needed to implement the specific change in the communications network and an operator is enabled, on a user interface, to generate the workflow as a sequence of selected building blocks among the catalog of building blocks, the sequence aligning input and output of the workflow with inputs and outputs of the selected building blocks, and
wherein each building block is defined using an input/output parameter list and has a representational state transfer (REST) application programming interface (API);
obtaining one or more verification rules for comparing pre-impact network performance and post-impact network performance associated with the one or more changes;
determining a schedule for deploying the one or more changes in the communications network, wherein the deploying the one or more changes is based on the workflow, the one or more verification rules and scheduling constraints, wherein the scheduling constraints comprise a conflict scope constraint, a concurrency constraint, a uniformity constraint, and a localize constraint, and wherein the concurrency constraint maximizes a number of network function instances to be executed concurrently within a group of virtual network elements, and wherein the uniformity constraint constrains schedule changes such that instances have common time zone attribute values;

executing the one or more changes in the communications network according to the schedule;

subsequent to executing the one or more changes in the communications network, determining whether a comparison of the pre-impact network performance and the post-impact network performance is within one or more thresholds associated with the one or more verification rules;

sending an alert when the comparison is outside the one or more thresholds; and halting or reversing the one or more changes in the communications network when the comparison is outside the one or more thresholds.

16. The non-transitory, computer readable storage medium of claim 15, wherein the obtaining the workflow further comprises obtaining the workflow directed to a software upgrade workflow using the building blocks of a health check block, a software upgrade block, a pre/post comparison block, and a roll-back block.

17. The non-transitory, computer readable storage medium of claim 16, wherein the software upgrade workflow further comprises decisions operators after the health check block, the software upgrade block, and the pre/post comparison block.

18. The non-transitory, computer readable storage medium of claim 15, wherein the input to the workflow comprises a network function instance and the output of the workflow comprises a status of execution.

19. The non-transitory, computer readable storage medium of claim 15, wherein each building block corresponds to a node and an edge connects two building blocks.

20. The non-transitory, computer readable storage medium of claim 19, wherein the obtaining one or more verification rules further comprises checking a presence of a building block having no edge.

* * * * *